United States Patent
Horimoto

(10) Patent No.: US 11,421,676 B2
(45) Date of Patent: Aug. 23, 2022

(54) COOLING DEVICE

(71) Applicant: PHC HOLDINGS CORPORATION, Tokyo (JP)

(72) Inventor: Nobuo Horimoto, Ehime (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 109 days.

(21) Appl. No.: 17/011,267

(22) Filed: Sep. 3, 2020

(65) Prior Publication Data

US 2020/0400138 A1    Dec. 24, 2020

Related U.S. Application Data

(63) Continuation of application No. PCT/JP2019/007002, filed on Feb. 25, 2019.

(30) Foreign Application Priority Data

Mar. 14, 2018 (JP) .............................. JP2018-046311

(51) Int. Cl.
| | |
|---|---|
| *F04B 49/06* | (2006.01) |
| *F04B 49/10* | (2006.01) |
| *F25B 49/02* | (2006.01) |
| *F25D 11/00* | (2006.01) |
| *F25D 29/00* | (2006.01) |

(52) U.S. Cl.
CPC ............ *F04B 49/06* (2013.01); *F04B 49/103* (2013.01); *F25B 49/022* (2013.01); *F25D 11/00* (2013.01); *F25D 29/00* (2013.01)

(58) Field of Classification Search
CPC ...... F04B 49/06; F04B 49/103; F25B 49/022; F25D 11/00; F25D 29/00
See application file for complete search history.

(56) References Cited

U.S. PATENT DOCUMENTS

| | | | | |
|---|---|---|---|---|
| 5,632,155 A | * | 5/1997 | Sugiyama | F24F 1/0073 62/277 |
| 5,775,116 A | * | 7/1998 | Matsumoto | F24F 11/30 62/155 |
| 6,508,072 B1 | * | 1/2003 | Kanazawa | F25B 49/025 236/78 D |

FOREIGN PATENT DOCUMENTS

| | | |
|---|---|---|
| JP | S59-86869 A | 5/1984 |
| JP | H01-134872 U | 9/1989 |
| JP | H07-118922 B2 | 12/1995 |

OTHER PUBLICATIONS

Machine translation of JP H01-134872U, retrieved Mar. 15, 2022 (Year: 1989).*
International Search Report and Written Opinion issued in International Patent Application No. PCT/JP2019/007002, dated May 28, 2019; with partial English translation.

* cited by examiner

*Primary Examiner* — Patrick Hamo

(74) *Attorney, Agent, or Firm* — McDermott Will & Emery LLP

(57) ABSTRACT

Provided is a cooling device capable of surely stopping the operation of a compressor when stopping the operation of the compressor is required. A cooling device comprises: a motor for driving a compressor that constitutes a refrigerant circuit for cooling a cooling room (R); and a first relay and a second relay that are arranged in series on an electric circuit for supplying electric power to the motor.

13 Claims, 7 Drawing Sheets

COOLING DEVICE

CROSS-REFERENCE OF RELATED APPLICATIONS

This application is a U.S. Continuation of International Patent Application No. PCT/JP2019/007002, filed on Feb. 25, 2019, which in turn claims the benefit of Japanese Application No. 2018-046311, filed on Mar. 14, 2018, the entire disclosures of which Applications are incorporated by reference herein.

TECHNICAL FIELD

The present invention relates to a cooling apparatus.

BACKGROUND ART

In known cooling apparatuses, whether to supply power to a motor for driving a compressor for circulating a refrigerant circuit is controlled by on-off of a relay as disclosed in PTL 1, for example.

CITATION LIST

Patent Literature

PTL 1
Japanese Patent Application Laid-Open No. H07-118922

SUMMARY OF INVENTION

Technical Problem

In such a cooling apparatus, the relay allows a large current to flow through a contact of a small area. As such, the vicinity portion of the contact may be welded as a result of repetitive on-off. If the vicinity portion of the contact is welded, the relay cannot be turned off. In other words, when the compressor is required to be stopped, the compressor cannot be stopped. In this case, the cooling chamber may be excessively cooled.

The present invention has been made in view of such a situation, and an object of the present invention is to provide a cooling apparatus capable of reliably stopping the compressor when the compressor is required to be stopped.

Solution to Problem

A cooling apparatus according to the embodiment of the present invention includes a motor configured to drive a compressor constituting a refrigerant circuit configured to cool a cooling chamber; and a first relay and a second relay disposed in series on an electric circuit configured to supply power to the motor.

Advantageous Effects of Invention

According to the embodiment of the present invention, it is possible to provide a cooling apparatus capable of reliably stopping the compressor when the compressor is required to be stopped.

DESCRIPTION OF EMBODIMENTS

Hereinafter, an embodiment of the present invention will be described in detail with reference to the accompanying drawings.

Figure 1:
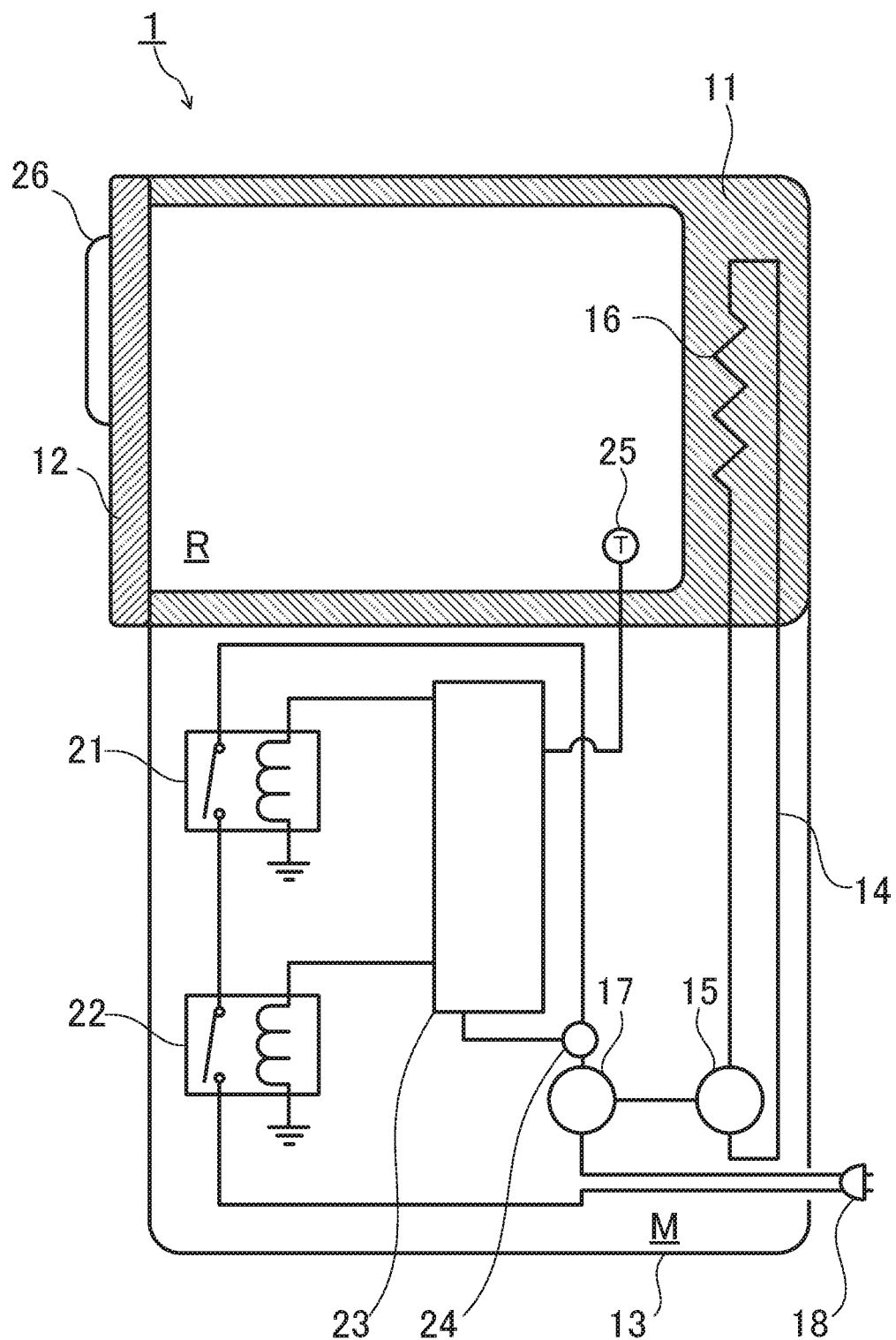
FIG. 1 is a schematic diagram of a cooling apparatus.

FIG. 1 is a schematic diagram of refrigerating apparatus 1, which is an example of a cooling apparatus according to the embodiment of the present invention. Refrigerating apparatus 1 is, for example, a refrigerator configured for refrigeration storage of blood or the like.

Refrigerating apparatus 1 includes heat insulating box 11 surrounding cooling chamber R, door 12 openably attached to heat insulating box 11, and housing 13 disposed below heat insulating box 11. Machine chamber M is provided inside housing 13.

Inside heat insulating box 11 and machine chamber M, refrigerant circuit 14 through which a refrigerant circulates is disposed. Refrigerant circuit 14 includes compressor 15, evaporator 16, a condenser and an expansion device (not illustrated), and the like.

Compressor 15 is driven by motor 17. The power for driving motor 17 is supplied through plug 18 from a power source such as a commercial power source. On the circuit for supplying power to motor 17, first relay 21 and second relay 22 are disposed in series. The number of relays disposed in series may be three or more. In addition, the rotational speed control of motor 17 may be performed by an inverter.

Control apparatus 23 is disposed inside machine chamber M or the like.

Control apparatus 23 outputs a control signal to first relay 21. Specifically, a first connection signal that commands first relay 21 to be connected, and a first disconnection signal that commands first relay 21 to be disconnected are output.

Control apparatus 23 outputs a control signal to second relay 22. Specifically, a second connection signal that commands second relay 22 to be connected, and a second disconnection signal that commands second relay 22 to be disconnected are output.

In addition, on the circuit that supplies power to motor 17 or in the vicinity of the circuit, a sensor that detects a value indicating the state of refrigerating apparatus 1 is disposed. Examples of such sensors include photocoupler 24 that detects voltage application to motor 17. Note that as a sensor that detects a value indicating the state of refrigerating apparatus 1, a voltmeter that detects the voltage applied to motor 17, or an ammeter that detects the supplied current may be disposed in place of or in addition to photocoupler 24. The detected values of these sensors are sent to control apparatus 23.

In addition, in cooling chamber R, a sensor that detects a value indicating the state of refrigerating apparatus 1, or more specifically, thermometer 25 that detects the temperature of cooling chamber R is disposed. The detected value of thermometer 25 is sent to control apparatus 23.

Operation display panel 26 is attached on the front surface of door 12. Operation display panel 26 is connected to control apparatus 23. Operation display panel 26 receives various operations, and displays various information such as the temperature of cooling chamber R. In addition, operation display panel 26 receives an alarm signal from control apparatus 23, and functions also as a notification part that notifies that an abnormality has occurred in the state of refrigerating apparatus 1.

In refrigerating apparatus 1 configured as described above, the target temperature of cooling chamber R is $T_0$ (e.g., 4° C.), and compressor 15 is on-off controlled such that the temperature of cooling chamber R falls within the range of $T_0 \pm \Delta T$ (e.g., 3° C.). When compressor 15 is activated (turned on), the refrigerant flows through refrigerant circuit 14 while changing the state, and the temperature of cooling chamber R is gradually lowered. In addition, when compressor 15 is stopped (turned off), the distribution of the refrigerant is stopped, and the internal temperature of cooling chamber R is gradually increased.

Figure 2:
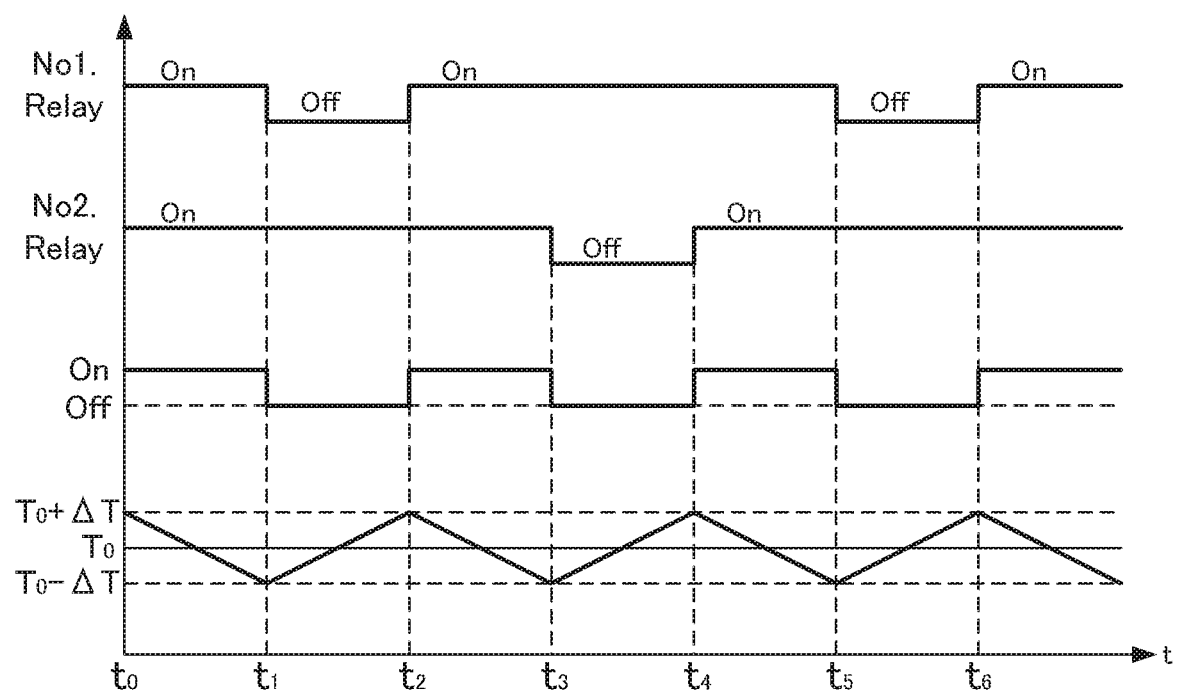
FIG. 2 illustrates a time chart in a normal state.

FIG. 2 illustrates a time chart of a state where each device is operating normally.

At time $t_0$, the first connection signal is output to first relay 21 (as indicated as "On" in the top chart), and the second connection signal is output to second relay 22 (as indicated as "On" in the second chart from the top). That is, first relay 21 and second relay 22 are in a connected state. Accordingly, a predetermined voltage is supplied to motor 17 and motor 17 is activated (the state of "On" in the third chart from the top), and compressor 15 is activated. Thus, the temperature of cooling chamber R is gradually lowered (the fourth chart from the top).

When the temperature of cooling chamber R reaches $T_0 - \Delta T$ (e.g., 4−3=1° C.), it is required to stop the operation of compressor 15. Since the temperature has reached such a temperature at time $t_1$, control apparatus 23 outputs the first disconnection signal to first relay 21 at time $t_1$ (as indicated as "Off" in the top chart). Upon receiving the first disconnection signal, first relay 21 is set to a disconnected state. Accordingly, the power supply to motor 17 is cut off, motor 17 is stopped (the state of "Off" in the third chart from the top), and compressor 15 is stopped. Thus, the temperature of cooling chamber R is not lower than $T_0 - \Delta T$ (the fourth chart from the top).

After time $t_1$, the temperature of cooling chamber R rises. When the temperature of cooling chamber R reaches $T_0 + \Delta T$ (e.g., 4+3=7° C.), it is required to resume the operation of compressor 15. Since the temperature has reached such a temperature at time $t_2$, control apparatus 23 outputs the first connection signal to first relay 21 at time $t_2$ (as indicated as "On" in the top chart). Upon receiving the first connection signal, first relay 21 is set to a connected state. Accordingly, the power supply to motor 17 is resumed, a predetermined voltage is applied to motor 17 so as to actuate motor 17 (the state of "On" in the third chart from the top), and compressor 15 is actuated. Thus, the temperature of cooling chamber R is not higher than $T_0 + \Delta T$ (the fourth chart from the top).

Thereafter, when the temperature of cooling chamber R reaches $T_0 - \Delta T$, it is required to stop the operation of compressor 15. Since the temperature has reached such a temperature at time $t_3$, control apparatus 23 outputs the second disconnection signal to second relay 22 at time $t_3$ (as indicated as "Off" in the second chart from the top). Upon receiving the second disconnection signal, second relay 22 is set to a disconnected state. Accordingly, the power supply to motor 17 is cut off, motor 17 is stopped (the state of "Off" in the third chart from the top), and compressor 15 is stopped. Thus, the temperature of cooling chamber R is not lower than $T_0 - \Delta T$ (the fourth chart from the top).

After time $t_3$, the temperature of cooling chamber R rises. When the temperature of cooling chamber R reaches $T_0 + \Delta T$, it is required to resume the operation of compressor 15. Since the temperature has reached such a temperature at time $t_4$, control apparatus 23 outputs the second connecting signal to second relay 22 at time 4 (as indicated as "On" in the second chart from the top). Upon receiving the second connection signal, second relay 22 is set to a connected state. Accordingly, the power supply to motor 17 is resumed, a predetermined voltage is applied to motor 17 so as to actuate motor 17 (the state of "On" in the third chart from the top), and compressor 15 is actuated. Thus, the temperature of cooling chamber R is not higher than $T_0 + \Delta T$ (the fourth chart from the top).

Subsequently, when the temperature of cooling chamber R reaches $T_0 - \Delta T$, it is required to stop the operation of compressor 15. Since the temperature has reached such a temperature at time $t_5$, control apparatus 23 outputs the first disconnection signal to first relay 21 at time $t_5$ (as indicated as "Off" in the top chart). Upon receiving the first disconnection signal, first relay 21 is set to a disconnected state. Accordingly, the power supply to motor 17 is cut off, motor 17 is stopped (the state of "Off" in the third chart from the top), and compressor 15 is stopped. Thus, the temperature of cooling chamber R is not lower than $T_0 - \Delta T$ (the fourth chart from the top).

After time $t_5$, the temperature of cooling chamber R rises. When the temperature of cooling chamber R reaches $T_0 + \Delta T$, it is required to resume the operation of compressor 15. Since the temperature has reached such a temperature at time $t_6$, control apparatus 23 outputs the first connection signal to first relay 21 at time $t_6$ (as indicated as "On" in the top chart). Upon receiving the first connection signal, first relay 21 is set to a connected state. Accordingly, the power supply to motor 17 is resumed, a predetermined voltage is applied to motor 17 so as to actuate motor 17 (the state of "On" in the third chart from the top), and compressor 15 is actuated. Thus, the temperature of cooling chamber R is not higher than $T_0 + \Delta T$ (the fourth chart from the top).

Subsequently, the above-described control is repeated.

As described above, in the present embodiment, first relay 21 and second relay 22 are disposed in series on the electric circuit for supplying power to motor 17. Thus, even when one relay is stuck, the power supply to motor 17, i.e., the on-off of compressor 15 can be controlled by turning on and off the other relay. In other words, the temperature of cooling chamber R can be controlled within the range of the target temperature $T_0 \pm$ allowable deviation $\Delta T$.

Moreover, in the present embodiment, first relay 21 and second relay 22 are operated alternately. In other words, control apparatus 23 alternately outputs the first disconnection signal that sets first relay 21 to the disconnected state and the second disconnection signal that sets second relay 22 to the disconnected state. Thus, it is possible to prevent a situation where, only one of the relays are continuously turned on and off, the load is concentrated on the one of the relays, and the one of the relays is stuck in a relatively short period.

Next, a control for a case where first relay 21 is stuck will be described with reference to FIG. 3. Note that it is needless to say that the same control is performed in the case where second relay 22 is stuck.

Figure 3:
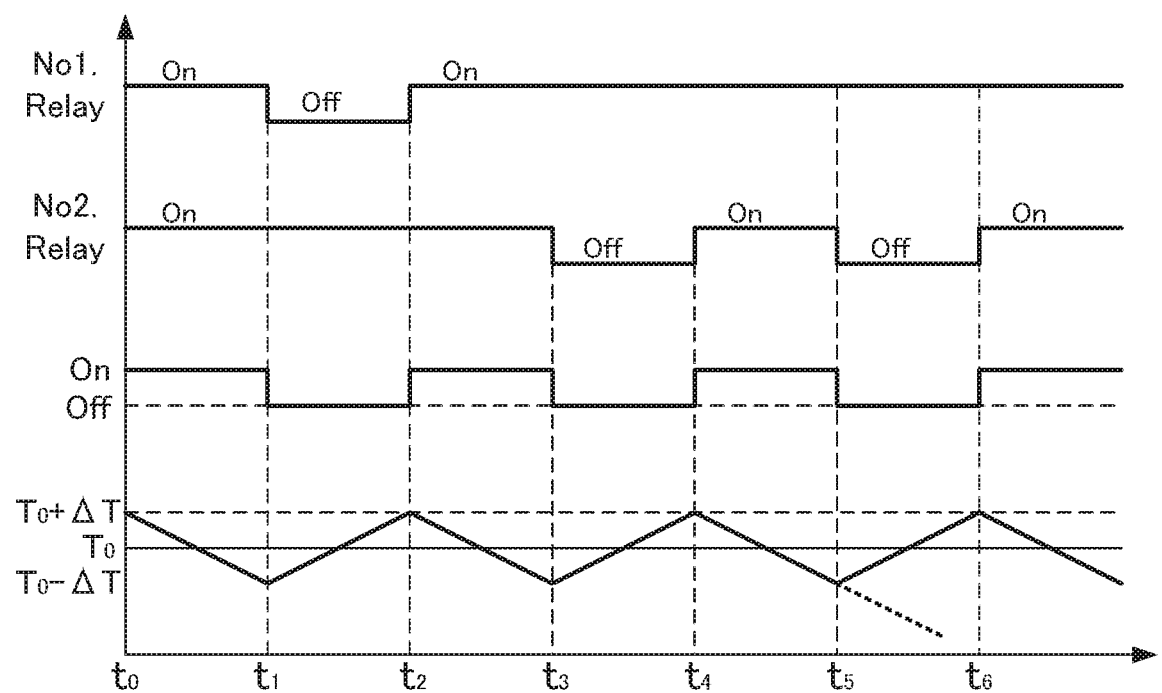
FIG. 3 is a time chart of a case where sticking of a first relay occurs.

The time chart illustrated in FIG. 3 is exactly the same as the time chart illustrated in FIG. 2 until time $t_5$. However, although it is not indicated in the time chart, sticking of first relay 21 has occurred at some timing between time $t_2$ and time $t_5$.

Accordingly, at time $t_5$, despite control apparatus 23 transmits the first disconnection signal to first relay 21, first relay 21 is not set to a disconnected state. In other words, first relay 21 is maintained in the connected state. In this case, a predetermined voltage continues to be applied to motor 17 even after time $t_5$, and motor 17 and compressor 15 may continue to operate. This means, as shown by the dashed lines, that the temperature of the cooling chamber R may continue to decrease after time $t_5$.

However, control apparatus 23 determines that sticking of first relay 21 has occurred, since the voltage remains applied although photocoupler 24 should detect that the voltage is not applied to motor 17 in response to transmission the first disconnection signal. Then, control apparatus 23 transmits the second disconnection signal to second relay 22 at time $t_5$.

Accordingly, at time $t_5$, instead of first relay 21 that was initially intended to be turned off, second relay 22 is turned off. Thus, the voltage applied to motor 17 becomes 0 without any trouble at time $t_5$. That is, motor 17 and compressor 15 stop the operations. As a result, the temperature of cooling chamber R starts to rise after time $t_5$.

Further, when the temperature of cooling chamber R reaches $T_0 + \Delta T$, it is required to resume the operation of compressor 15. Since the temperature has reached such a temperature at time $t_6$, control apparatus 23 outputs the second connecting signal to second relay 22 at time $t_6$ (as indicated as "On" in the second chart from the top). Upon receiving the second connection signal, second relay 22 is set to a connected state. Accordingly, the power supply to motor 17 is resumed, a predetermined voltage is applied to motor 17 so as to actuate motor 17 (the state of "On" in the third chart from the top), and compressor 15 is actuated. Thus, the temperature of cooling chamber R is not higher than $T_0 + \Delta T$ (the fourth chart from the top).

Note that after time $t_5$, the first connecting signal continues to be transmitted to first relay 21. In other words, it is set to an on state at all times. Thus, it is possible to prevent first relay 21 from turning off at an unintended timing when the sticking of the contact is eliminated by some accident.

Thereafter, by repeating the on-off of second relay 22, it is possible to control motor 17 and compressor 15 as in the normal state before the occurrence of sticking of first relay 21.

In addition, at time $t_5$, control apparatus 23 outputs, to operation display panel 26, an alarm signal notifying the occurrence of sticking of first relay 21.

Figure 4:
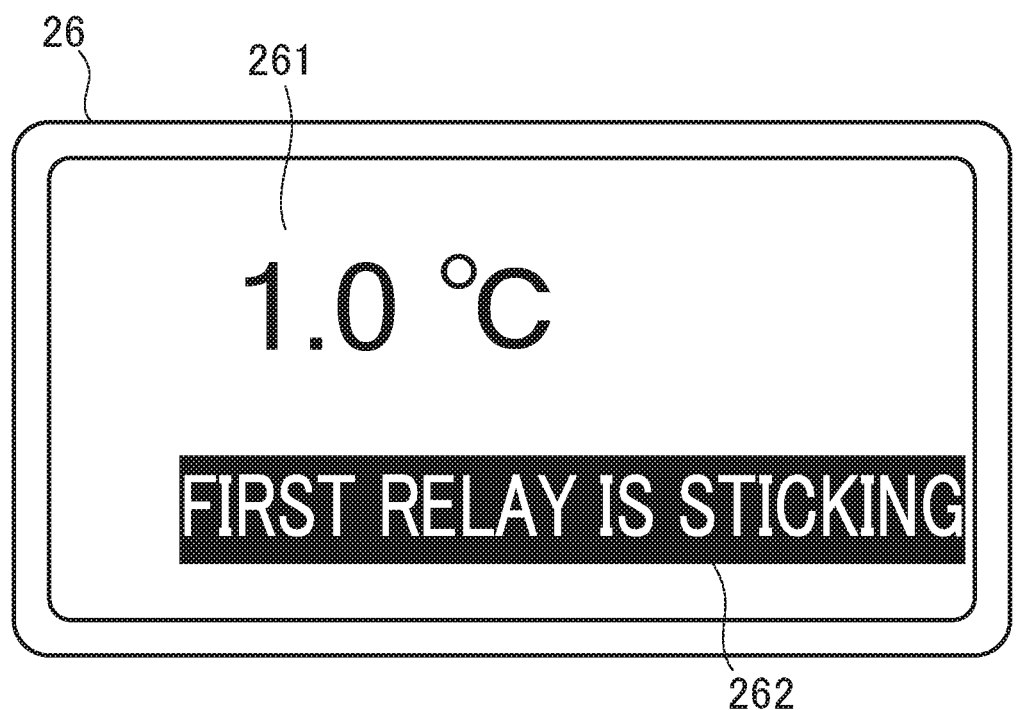
FIG. 4 illustrates an exemplary notification that notifies sticking of the first relay.

An exemplary display of operation display panel 26 is illustrated in FIG. 4. As illustrated in FIG. 4, operation display panel 26 includes temperature display part 261 for displaying the temperature of cooling chamber R, and alarm display part 262 for displaying some alarm. It also includes an operation input part (not illustrated). Note that when no alarm signal is output from control apparatus 23, nothing is displayed in alarm display part 262.

Upon receiving the alarm signal described above, operation display panel 26 causes alarm display part 262 to display a message informing the user of refrigerating apparatus 1 that sticking of first relay 21 has occurred.

In this manner, refrigerating apparatus 1 according to the present embodiment includes photocoupler 24, and control apparatus 23 outputs an alarm signal in the case where the detection signal of photocoupler 24 is abnormal after the first disconnection signal is output, and thus, it is possible to quickly inform the user that sticking of first relay 21 has occurred. It is needless to say that the same applies to the case where second relay 22 is stuck.

In addition, even in the case where the voltmeter that detects the voltage applied to motor 17 is installed, it is possible to determine that sticking of first relay 21 or second relay 22 has occurred when an abnormal value that is not 0 is detected at the timing when the voltage value applied to motor 17 should be 0. In addition, even in the case where the ammeter that detects the current supplied to motor 17 is installed, it is possible to determine that sticking of first relay 21 or second relay 22 has occurred when an abnormal value that is not 0 is detected at the timing when the current value supplied to motor 17 should be 0.

Figure 5:
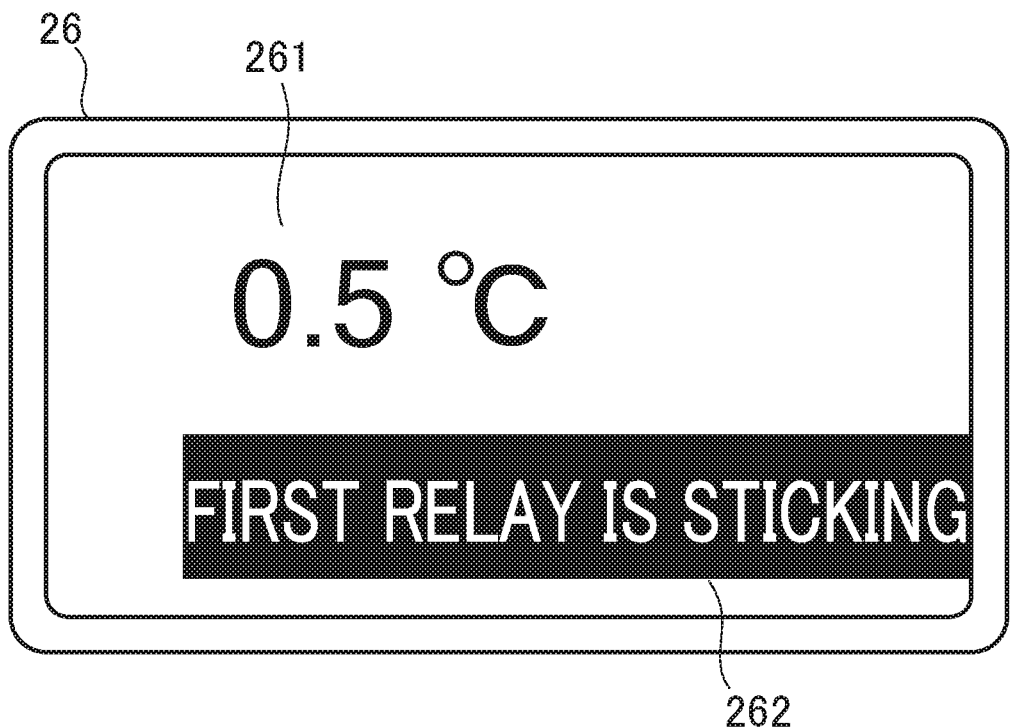
FIG. 5 illustrates another exemplary notification that notifies sticking of the first relay.

In addition, refrigerating apparatus 1 according to the present embodiment includes thermometer 25. Thus, when the temperature of cooling chamber R is equal to or lower than a predetermined threshold value lower than $T_0 - \Delta T$, control apparatus 23 may determine that sticking of first relay 21 has occurred. For example, control apparatus 23 may determine that sticking of first relay 21 has occurred when the temperature of cooling chamber R continues to decrease and becomes a predetermined threshold value (e.g., 0.5° C.) or less even after transmission of the first disconnection signal at the time when the temperature was IC. An exemplary display of operation display panel 26 in this case is illustrated in FIG. 5.

In this case, the number of parts can be advantageously reduced since thermometer 25 for detecting the temperature of cooling chamber R can be utilized also for the sticking detection of first relay 21 and second relay 22.

In addition, control apparatus 23 may perform detection of an abnormality at a stage before first relay 21 or second relay 22 is completely stuck, i.e., at a stage where these relays are deteriorated. A control in the case where first relay 21 starts to deteriorate will be described with reference to FIG. 6. It is needless to say that the same control can be performed also in the case where second relay 22 starts to deteriorate.

Figure 6:
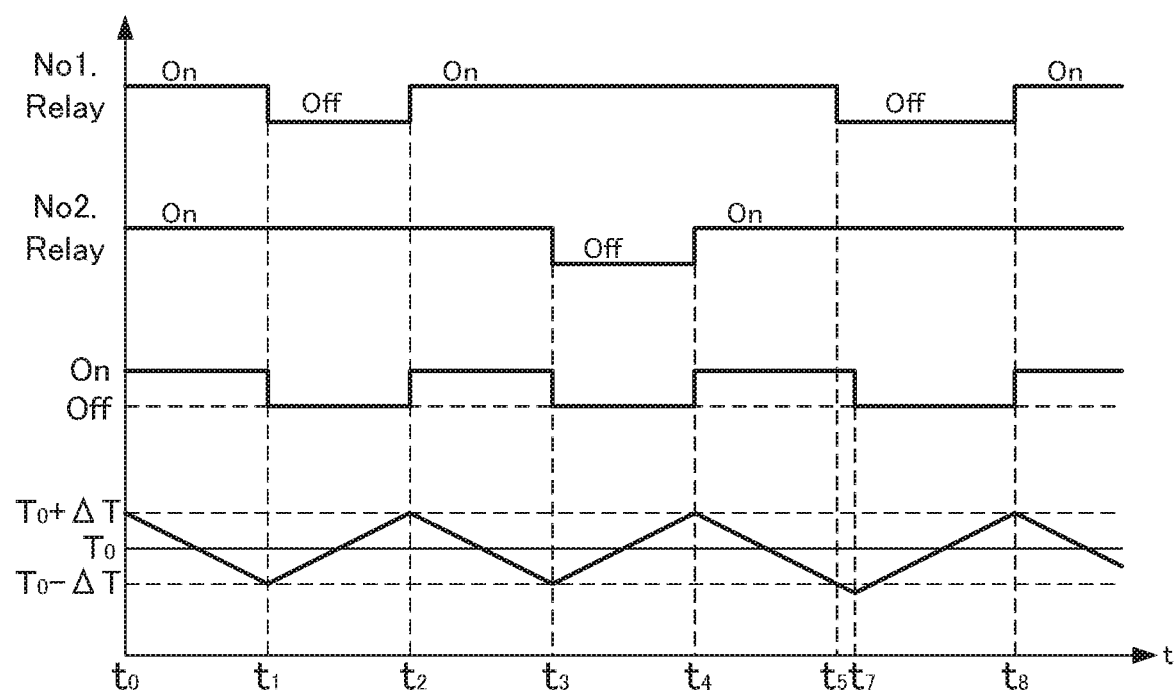
FIG. 6 is a time chart of a case where deterioration of the first relay starts.

FIG. 6 is a time chart when first relay 21 starts to deteriorate. Until time $t_5$, the time chart is the same as the time chart illustrated in FIG. 2. At time $t_5$, the temperature of cooling chamber R has reached $T_0 - \Delta T$, and therefore control apparatus 23 transmits the first disconnection signal to first relay 21 (as indicated as "Off" in the top chart).

At this time, when first relay 21 is deteriorated, first relay 21 is not turned off at $t_5$, and is turned off at time $t_7$ slightly after $t_5$. Accordingly, in the period between $t_5$ to $t_7$, a predetermined voltage (abnormal value) continues to be applied to motor 17, and motor 17 continues to operate (the state of "On" in the third chart from the top), and meanwhile, the temperature of cooling chamber R continues to decrease (the fourth chart from the top).

Note that in FIG. 6, for ease of understanding, the distance between $t_5$ and $t_7$ is drawn in a larger scale in such a manner that the temperature of cooling chamber R between $t_5$ and $t_7$ largely decrease. In fact, the time period between $t_5$ and $t_7$ is short (about a few milliseconds), and the temperature drop in that time period is negligible.

Control apparatus 23 determines that deterioration of first relay 21 has occurred when there is a time lag greater than a predetermined value (e.g., 0 s) in a time period between transmission of the first disconnection signal, and a time when the voltage applied to motor 17 becomes 0 (normal value) (photocoupler 24 detects that the voltage is not applied to motor 17). In other words, it is determined that first relay 21 is slightly stuck. Then, control apparatus 23 outputs, to operation display panel 26, a deterioration notification signal notifying that first relay 21 has started to deteriorate.

Figure 7:
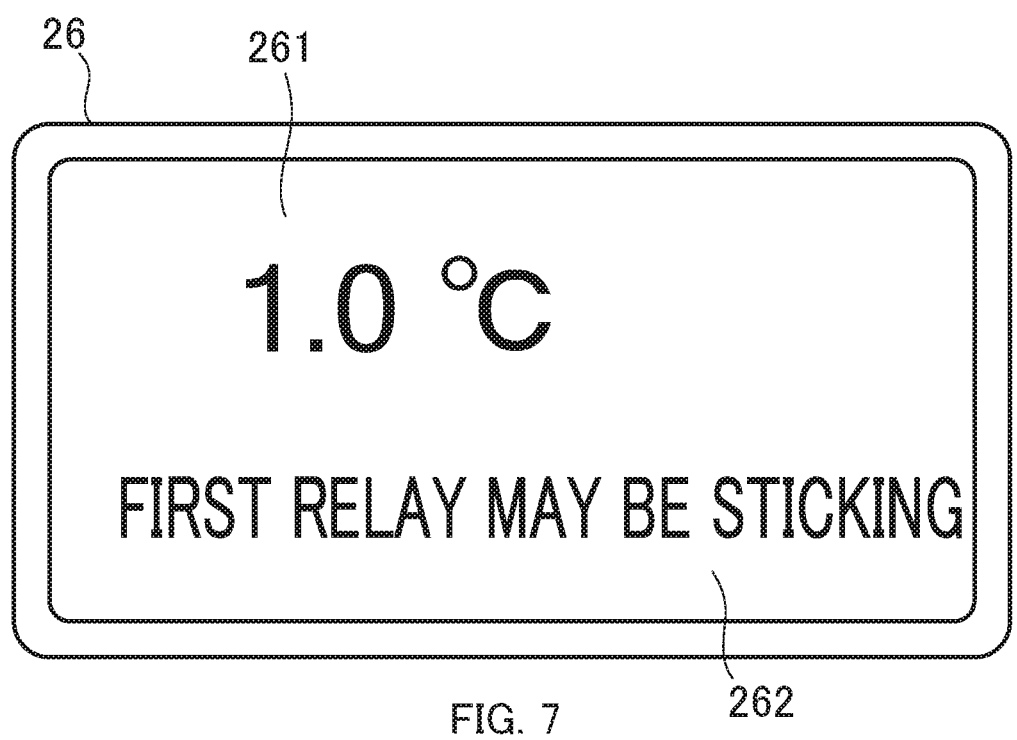
FIG. 7 illustrates an exemplary notification that notifies that deterioration of the first relay has started.

FIG. 7 illustrates an exemplary display of operation display panel 26 that has received a deterioration notification signal. Alarm display part 262 displays a message indicating that first relay 21 starts to deteriorate, or that first relay 21 may be starting to deteriorate. It is needless to say that the content displayed in alarm display part 262 in response to reception of a deterioration notification signal is not limited to that illustrated in FIG. 7.

Therefore, in refrigerating apparatus 1 according to the present embodiment, it is possible to detect that the deterioration has occurred in first relay 21 or second relay 22 in the stage before the sticking actually occurs in first relay 21 or second relay 22. Thus, a spare relay can be prepared before sticking occurs, and the deteriorated relay may be replaced with a spare relay, and in this manner, the operation of refrigerating apparatus 1 can be prevented from being affected.

Note that as illustrated in FIG. 6, at time $t_7$, first relay 21 is turned off and the power supply to motor 17 is cut off, and accordingly, thereafter, the temperature of cooling chamber R starts to increase. Then, at time $t_8$, the temperature of cooling chamber R reaches $T_0+\Delta T$, and accordingly the first connection signal is transmitted to first relay 21, and, compressor 15 starts to operate again. Accordingly, thereafter, the temperature of cooling chamber R starts to decrease.

In the above-described exemplary control, control apparatus 23 outputs a deterioration notification signal when a situation entailing a time lag between the time when the first disconnection signal is output and the time when the voltage applied to motor 17 becomes 0 (normal value) occurs once. However, the condition under which control apparatus 23 outputs a deterioration notification signal is not limited to such a condition.

For example, control apparatus 23 may output a deterioration notification signal when the situation entailing the occurrence of the time lag continuously occurs a predetermined number of times. In this case, it is possible to prevent a situation where any of the relays is mistakenly recognized as starting to deteriorate when one time lag has occurred for some reason even though no deterioration has actually occurred. In other words, it is possible to more precisely detect that first relay 21 or second relay 22 has started to deteriorate.

In addition, the condition for outputting the deterioration notification signal indicating that first relay 21 has started to deteriorate and the condition for outputting the deterioration notification signal indicating that second relay 22 has started to deteriorate may be different from each other.

For example, the condition for outputting the deterioration notification signal indicating that first relay 21 has started to deteriorate may be that a situation entailing the time lag between the time when the first disconnection signal is output and the time when the voltage applied to motor 17 becomes 0 successively occurs a first threshold times. In this case, the condition for outputting the deterioration notification signal indicating that second relay 22 has started to deteriorate may be that the situation entailing the time lag between the time when the second disconnection signal is output and the time when the voltage applied to motor 17 becomes 0 successively occurs a second threshold times. The second threshold is a value larger than the first threshold.

The condition for outputting the deterioration notification signal indicating that first relay 21 has started to deteriorate may be that a first time length or longer has elapsed in a time period between the when the first disconnection signal is output and the time when the voltage applied to motor 17 becomes 0. In this case, the condition for outputting the deterioration notification signal indicating that second relay 22 has started to deteriorate may be that a second time length or longer has elapsed in a time period between the time when the second disconnection signal is output and the time when the voltage applied to motor 17 becomes 0. The second time length is longer than the first time length.

In this manner, in the case where first relay 21 and second relay 22 have the same quality and are started to use at the same time, for example, first relay 21 and second relay 22 can be prevented from being determined as starting to deteriorate at the same time.

In the case of each of the above examples, it is determined that first relay 21 has started to deteriorate first. Therefore, by replacing only first relay 21, refrigerating apparatus 1 can be restored to the normal state from the abnormal state, and the operation of refrigerating apparatus 1 can be continued.

In addition, after it is detected that one of the relays has started to deteriorate, only one of the relays may be turned on and off while maintaining the other relay in a connected state by continuing to send a connection signal to the other relay. For example, after it is detected that first relay 21 has started to deteriorate, i.e., after the deterioration notification signal indicating that first relay 21 has started to deteriorate is output, the on and off of motor 17 and compressor 15 may be controlled by turning on and off only first relay 21 while maintaining second relay 22 in the connected state by continuing to send the second connection signal to second relay 22.

With such a control, first relay 21 that has started to deteriorate first can be intensively used and forcibly stuck prior to second relay 22. In other words, the life of second relay 22 that has not started to deteriorate can be preserved. As a result, since second relay 22 still has a sufficiently long life even when first relay 21 is stuck, the spare relay can be prepared and first relay 21 can be replaced with sufficient time margin.

Conversely, after it is detected that one of the relays has started to deteriorate, only the other relay may be turned on and off while maintaining the relay in a connected state by continuing to send the connection signal to the relay. For example, after it is detected that first relay 21 has started to deteriorate, i.e., after the deterioration notification signal indicating that first relay 21 has started to deteriorate is output, the on and off of motor 17 and compressor 15 may be controlled by turning on and off only second relay 22 while maintaining first relay 21 in the connected state by continuing to send the first connection signal to first relay 21.

With such control, the on-off of motor 17 and compressor 15 with the relay that has started to deteriorate. i.e., the control entailing time delay with the relay that has started to deteriorate (i.e., the relay that is slightly deteriorated) can be prevented. Thus, the on-off of motor 17 and compressor 15 can be more precisely controlled, and by extension, the temperature of cooling chamber R can be more precisely controlled.

Note that the present invention is not limited to the embodiment described above, and it is needless to say that various modifications and applications are possible without departing from the gist.

For example, the cooling apparatus according to the embodiment of the present invention is not limited to a refrigerator, and may be a medical freezer, a showcase, a refrigerated warehouse, an ice-making machine, or the like. In addition, the target temperature of cooling chamber R may not be 4° C., and the allowable deviation (ΔT) from the target temperature may not be 3° C.

In addition, the on-off of first relay 21 and the on-off of second relay 22 may not alternate every time. For example, the on-off of first relay 21 and the on-off of second relay 22 may be alternately performed at each predetermined multiple times. In other words, the first disconnection signal and the second disconnection signal may be alternately output multiple times each. In short, it suffices that output of the first disconnection signal for a first predetermined number of times or less, and output of the second disconnection signal for a second predetermined number of times or less are performed in a switching manner. For example, two or less continuous outputs of the first disconnection signal and two or less continuous outputs of the second disconnection signal may be performed in a switching manner. As such a case, a case is exemplified in which the first disconnection signal is output twice, the second disconnection signal is output once, the first disconnection signal is output once, and then the second disconnection signal is output twice in this order. Note that the case where the first disconnection signal and the second disconnection signal are alternately output corresponds to the case where the first predetermined number of times is one and the second predetermined number is one.

In addition, the on and off of first relay 21 and second relay 22 may alternate for each predetermined time (e.g., one hour or one day). In addition, the relay to be turned on and off may be changed when the accumulated value of the time during which it is turned on reaches a predetermined value.

In addition, the way of notifying sticking of the relay or notifying that sticking of the relay has started is not limited to the display with a message on operation display panel 26. For example, the notification may be provided in the form of turning on or flashing of a lamp installed in or outside operation display panel 26, or in the form of a sound made by outputting a buzzer or the like.

In addition, the alarm signal such as the deterioration notification signal may be transmitted to an external terminal, such as a terminal used by a maintenance contractor, connected with the cooling apparatus through a network. In this case, since the maintenance contractor can know the sticking of the relay or the like early, the relay that has started to stick or deteriorate can be quickly replaced.

Further, the cooling apparatus according to the embodiment of the present invention may have two single refrigerant circuits. In this case, even when the ability of each refrigerant circuit is somewhat small, a cryogenic temperature can be obtained by operating both refrigerant circuits. In addition, even when a problem occurs in one of the refrigerant circuits, the minimum necessary refrigeration ability can be ensured by operating the other refrigerant circuit.

In addition, the cooling apparatus according to the embodiment of the present invention may be provided with a dual refrigerant circuit. In a dual refrigerant circuit, two types of refrigerant having different boiling points are circulated in respective independent refrigerant circuits and heat exchange is caused between the two types of refrigerant through a cascade heat exchanger, and thus, the dual refrigerant circuit obtains a cryogenic temperature. With such a dual refrigerant circuit, the cooling apparatus according to the embodiment of the present invention can more reliably obtain a cryogenic temperature.

In both the single refrigerant circuit and the dual refrigerant circuit, heat exchange may be caused between the refrigerant moving toward the evaporator and the refrigerant output from the evaporator, and the refrigerant may be condensed stepwise starting with the refrigerant with the highest boiling point among the multiple types of refrigerants as a matter of course.

The disclosure of the description, drawings and abstract contained in the Japanese application of Japanese Patent Application No. 2018-046311, filed Mar. 14, 2018, is all incorporated in this application.

INDUSTRIAL APPLICABILITY

The present invention is suitably utilized as a cooling apparatus that turns on and off a compressor.

REFERENCE SIGNS LIST

1 Refrigerating apparatus
11 Insulating box
12 Door
13 Housing
14 Refrigerant circuit
15 Compressor
16 Evaporator
17 Motor
18 Plug
21 First relay
22 Second relay
23 Control apparatus
24 Photocoupler
25 Thermometer
26 Operation display panel
261 Temperature display part
262 Alarm display part
R Cooling chamber
M Machine chamber

The invention claimed is:

1. A cooling apparatus comprising:
a motor configured to drive a compressor constituting a refrigerant circuit configured to cool a cooling chamber;
a first relay and a second relay disposed in series on an electric circuit configured to supply power to the motor;
a sensor configured to detect a value indicating a state of the cooling apparatus; and
a control apparatus configured to control a power supply to the motor by controlling the second relay by alternately and repeatedly outputting a second disconnection signal that commands the second relay to be disconnected and a second connection signal that commands the second relay to be connected based on a detected value of a thermometer that detects a temperature of the cooling chamber when a detected value of the sensor is abnormal after a first disconnection signal that commands the first relay to be disconnected is output based on a detected value of the thermometer.

2. The cooling apparatus according to claim 1, wherein the control apparatus is configured to perform, in a switching manner, an operation of outputting a first disconnection signal a first predetermined number of times or less and an operation of outputting a second disconnection signal a second predetermined number of times or less, the first disconnection signal being configured to disconnect the first relay, the second disconnection signal being configured to disconnect the second relay.

3. The cooling apparatus according to claim 2, wherein the control apparatus alternately outputs the first disconnection signal and the second disconnection signal.

4. The cooling apparatus according to claim 2, wherein when a detected value detected by the sensor is abnormal after the first disconnection signal or the second disconnection signal is output, the control apparatus outputs an alarm signal.

5. The cooling apparatus according to claim 4, wherein the sensor is a photocoupler configured to detect application of a voltage to the motor, a voltmeter configured to detect a voltage applied to the motor, or an ammeter configured to detect a current supplied to the motor.

6. The cooling apparatus according to claim 5, wherein the control apparatus outputs, as the alarm signal, a deterioration notification signal notifying that the first relay or the second relay has started to deteriorate in response to an occurrence of a situation where the detected value is abnormal in a period until a predetermined time is elapsed after the first disconnection signal or the second disconnection signal is output and the detected value is normal after the predetermined time is elapsed after the first disconnection signal or the second disconnection signal is output.

7. The cooling apparatus according to claim 6, wherein the control apparatus outputs the deterioration notification signal when the situation continuously occurs a predetermined number of times with respect to the first relay or the second relay.

8. The cooling apparatus according to claim 6, wherein a condition for outputting the deterioration notification signal notifying that the first relay is started to deteriorate, and a condition for outputting the deterioration notification signal notifying that the second relay is started to deteriorate are different from each other.

9. The cooling apparatus according to claim 6, wherein the control apparatus does not output the second disconnection signal after the deterioration notification signal notifying that the first relay is started to deteriorate is output, and does not output the first disconnection signal after the deterioration notification signal notifying that the second relay is started to deteriorate is output.

10. The cooling apparatus according to claim 4, wherein the sensor is a temperature sensor configured to detect a temperature of the cooling chamber.

11. The cooling apparatus according to claim 4, further comprising a notification part configured to receive the alarm signal and to notify that an abnormality has occurred in the state of the cooling apparatus.

12. The cooling apparatus according to claim 1, wherein the control apparatus is configured to continue outputting a first connecting signal that commands the first relay to be connected when a detected value of the sensor is abnormal after the first disconnection signal is output.

13. The cooling apparatus according to claim 1, wherein the control apparatus is configured to control the first relay and the second relay to make the cooling apparatus in a predetermined condition and to control the second relay to make the cooling apparatus in the predetermined condition when a detected value of the sensor is abnormal after the first disconnection signal is output.

* * * * *